US011809833B2

(12) United States Patent
Renker et al.

(10) Patent No.: US 11,809,833 B2
(45) Date of Patent: Nov. 7, 2023

(54) SYSTEM AND METHOD FOR IMAGE LOCALIZATION IN KNOWLEDGE BASE CONTENT (71) Applicant: DELL PRODUCTS, LP, Round Rock, TX (US)

(72) Inventors: Travis Renker, Georgetown, TX (US); Sherry Keller, Austin, TX (US); Eriko Yokoyama, Austin, TX (US); Takanori Moriyama, Kawasaki (JP)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 17/016,655

(22) Filed: Sep. 10, 2020

(65) Prior Publication Data
US 2022/0075963 A1  Mar. 10, 2022

(51) Int. Cl.
G06F 40/40 (2020.01)
G06F 40/53 (2020.01)
G06F 40/58 (2020.01)
G06F 16/23 (2019.01)

(52) U.S. Cl.
CPC .......... *G06F 40/58* (2020.01); *G06F 16/2379* (2019.01)

(58) Field of Classification Search
CPC ........... G06F 40/40; G06F 40/53; G06F 40/58
USPC .................................................... 704/2, 3, 8
See application file for complete search history.

(56) References Cited

U.S. PATENT DOCUMENTS

| 4,945,476 | A | 7/1990 | Bodick et al. |
| 6,219,632 | B1* | 4/2001 | Schumacher ........... G06F 40/35 704/8 |
| 9,195,648 | B2 | 11/2015 | Giraudy et al. |
| 9,881,002 | B1* | 1/2018 | Qureshi .................. G06F 40/40 |
| 10,373,191 | B2* | 8/2019 | Shinohara ............. G06F 3/0482 |
| 2008/0278481 | A1* | 11/2008 | Aguera y Arcas ..... G06F 16/54 345/419 |
| 2012/0159430 | A1* | 6/2012 | Waldbaum .............. G06F 9/454 717/106 |
| 2013/0014004 | A1* | 1/2013 | Virk ...................... G06F 40/154 715/234 |
| 2013/0311165 | A1* | 11/2013 | Laird ...................... G06F 40/40 704/2 |

(Continued)

FOREIGN PATENT DOCUMENTS

WO  2002011035 A1  7/2002

Primary Examiner — Martin Lerner
(74) Attorney, Agent, or Firm — Larson Newman, LLP (57) ABSTRACT An information handling system includes a memory device and a processor. The processor instantiates a knowledge base that includes knowledge base information arranged into a parent image locale (PIL) that includes a parent image that presents a portion of the knowledge base information in a first language. The processor translates the knowledge base information into a second language. In translating, the processor further determines that the knowledge base information has previously been translated into the second language based upon the knowledge base information being further arranged into a child image locale (CIL) that includes a child image that presents the portion of the knowledge base information in the second language, and replaces the child image with the parent image in the CIL when a first date when the parent image was modified is later than a second date when the child image was modified.

20 Claims, 6 Drawing Sheets (56) References Cited

U.S. PATENT DOCUMENTS

| | | | | |
|---|---|---|---|---|
| 2014/0172409 A1* | 6/2014 | Brunswig | ............... | G06F 9/454 |
| | | | | 704/2 |
| 2017/0113143 A1* | 4/2017 | Marr | .................... | A63F 13/355 |
| 2018/0052832 A1* | 2/2018 | Anglin | .................... | G06F 40/58 |
| 2019/0325627 A1* | 10/2019 | Kunieda | ................. | G06T 11/60 |

* cited by examiner

SYSTEM AND METHOD FOR IMAGE LOCALIZATION IN KNOWLEDGE BASE CONTENT

FIELD OF THE DISCLOSURE

This disclosure generally relates to information handling systems, and more particularly relates to managing image localization in knowledge base content.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may instantiate a knowledge base having knowledge base information arranged into a parent image locale (PIL) that includes a parent image that presents a portion of the knowledge base information in a first language. The system may further translate the knowledge base information into a second language. In translating, the system may further determine that the knowledge base information has previously been translated into the second language based upon the knowledge base information being further arranged into a child image locale (CIL) that includes a child image that presents the portion of the knowledge base information in the second language, and replace the child image with the parent image in the CIL when a first date when the parent image was modified is later than a second date when the child image was modified.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
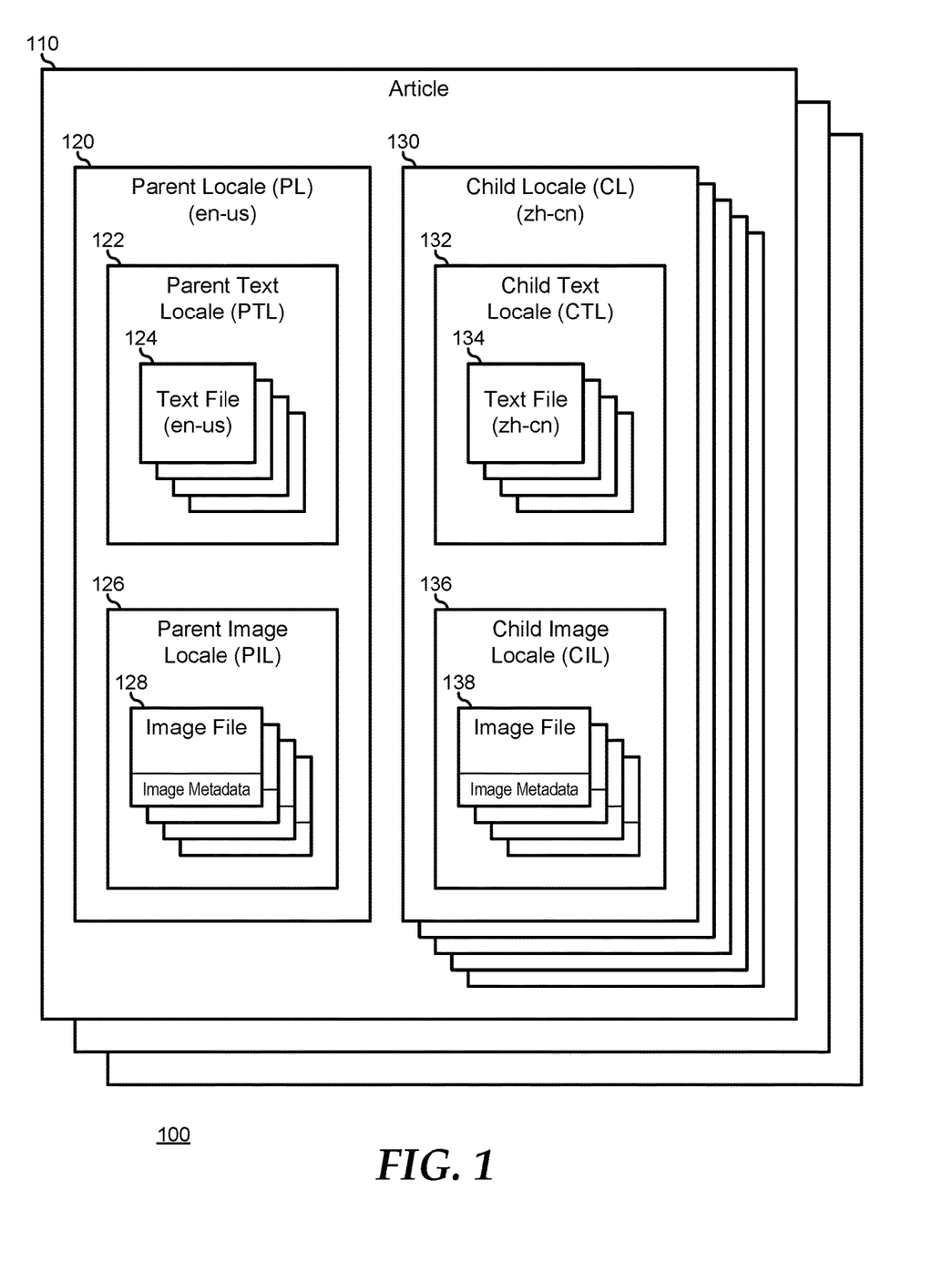
FIG. 1 is an illustration of a knowledge base according to an embodiment of the current disclosure.

FIG. 1 illustrates a knowledge base 100 including a number of articles 110. Knowledge base 100 represents a collection of information about a particular subject area or group of related subjects, that is organized and curated in a way to make the information more accessible and usable to clients of a knowledge base system. Here, a knowledge base system may be understood as computer hardware and the software that operates on the computer hardware to create, monitor, maintain, and edit the information included in knowledge base 100. The knowledge system may further be understood to provide mechanisms for ease of access to the information included in knowledge base 100. Thus, as used herein, the "knowledge base" will be understood to refer to the information that is stored in and manipulated by the "knowledge base system." The functions of a knowledge base system in creating, monitoring, maintaining, and editing the information of a knowledge base and for providing access to the information of the knowledge base are known in the art and will not be further described herein, except as needed to illustrate the current embodiments.

Articles 110 each represent a collection of information that is related to a common subject area, and that is organized to be accessed by the clients. Each article 110 includes content items that encapsulate the information of the article. In the simplest case, an article 110 will include content that is created, monitored, maintained, and edited in, and provided for access by a single language. In this case, the content items will be organized and structured as a parent locale (PL) 120 of article 110. PL 120 includes various content objects that are organized to be presented in a logical order and to make a presentation of the information included therein. For the purpose of the present disclosure, the contents objects will be represented as text files and image files. As such, PL 120 includes a parent text locale (PTL) 122 that includes one or more text files 124 in the parent language, and a parent image locale (PIL) 126 that includes one or more image files 128 that may or may not include text in the parent language.

In the more generalized case, article 110 will include content that is created, monitored, maintained, and edited in, and provided for access by one or more additional language. In this case, the content items will be further organized and structured as one or more child locale (CL) 130 of the article. CL 130 includes various content objects that are organized to be presented in a logical order and to make a presentation of the information included therein, and the organization typically mirrors the organization of the associated PL 120. As such, CL 130 includes a child text locale (CTL) 132 that includes one or more text files 134 in the child language, and a child image locale 136 that includes one or more image files 138 that may or may not include text in the child language.

Here, the term "text file" will be understood broadly to include files and formats that cover a wide range of textual content, and should not be construed narrowly to content items that are exclusively text based. For example, text file 124 may include simple text content, such as SMS messages, .TXT files, notebook files, and the like, processed text-based contents such as word processing files, databases, spreadsheets, presentations, and the like, or more specialized content that embeds text objects within a larger file format, such as HyperText (HTTP) files, XML files, and the like, or other file types that include textual information, as needed or desired. Further, the term "image file" will be understood broadly to include files and formats that cover a wide range of visual content, and should not be construed narrowly to content items that are exclusively picture based. For example, image file 128 may include simple image content, such as JIF files, bitmap files, .jpg files, TIFF files, and the like, video content files, such as .avi files, .mpg files, .mp4 files, and the like, or other types of visual content, as needed or desired. Further, one or more of text file or image file may be understood to include audio content, as needed or desired. It may further be so that the types of content stored in PTL 122 or CTL 132, and the types of content stored in PIL 126 or CIL 136, may have significant overlap, and the particular organization of the information in PL 120 and CL 130 will be determined based upon the needs or desires of the particular design or knowledge base designer. Thus, the details of organizing information in a knowledge base article are known in the art and will not be further described herein, except as needed to illustrate the current embodiments.

Historically, the translation from PL 120 to the one or more CLs 130 was performed manually, with each text file 124 being manually translated to a corresponding text file 134. Similarly, each image file 128 that included text being would be manually translated, or "re-shot" in the translated language to provide a corresponding image file 138. For example, where article 110 included information describing the operation and manipulation of a user interface (UI), the translation of text files from text file 124 to text file 134 was a straight forward translation task. On the other hand, an image file 128 of a screen capture in the parent language could not typically simply be translated. Rather, a new image file 138 of a screen capture of the same screen in the child language would need to be taken. Thus, where an overall structure for PL 120 was mirrored to the structure of CL 130, the particular image file 128 could not simply be ported from its location in PIL 126 to the corresponding location in CIL 136, but the re-shot image file 138 needed to be substituted into the location in the CIL. As language translation tools have improved, the text portion of the translation from PL 120 to CL 130 has been highly automated, applying a text translator to each text file 124 to create the corresponding text file 134 in the target language, and loading the translated text file 134 to the corresponding location in CTL 132. However, early knowledge base translation tools either left the translation of the image content from PIL 126 to CIL 136 as a manual task, or simply over-wrote CIL 136 with the content and structure of PIL 126, leaving the decision as to whether to use the PIL images, or to again, manually reinsert the previously translated images into the CIL. For example, if, in the original translation, where a screen capture, GUI_Image1_en-us.jpg was stored in PIL 126, a new screen capture could be recaptured as GUI_Image1_zh-cn.jpg and stored in the associated location in CIL 136. However, when a change or revision to PL 120 was performed, CIL 136 would typically be overwritten such that the CIL now included GUI_Image1_en-us.jpg instead of GUI_Image1_zh-cn.jpg, and the correct image would need to be manually reinserted into the CIL. This approach led to growing labor inputs to the maintenance of knowledge bases, particularly where the PL was translated into multiple CLs, and only grew worse, as each update to the PL respawned another round of manual updates to ensure that the image content in the CIL reflected the local language. For example, where a knowledge base article includes seven (7) locales each with one image, a modification to the PL that includes a modified image will necessitate seven (7) modifications (one (1) to the PIL and six (6), one each, to the CILs). On the other hand, where a knowledge base article includes 23 locales each with five images, a modification my necessitate up to 23*5=115 edits to process image modifications.

Figure 2:
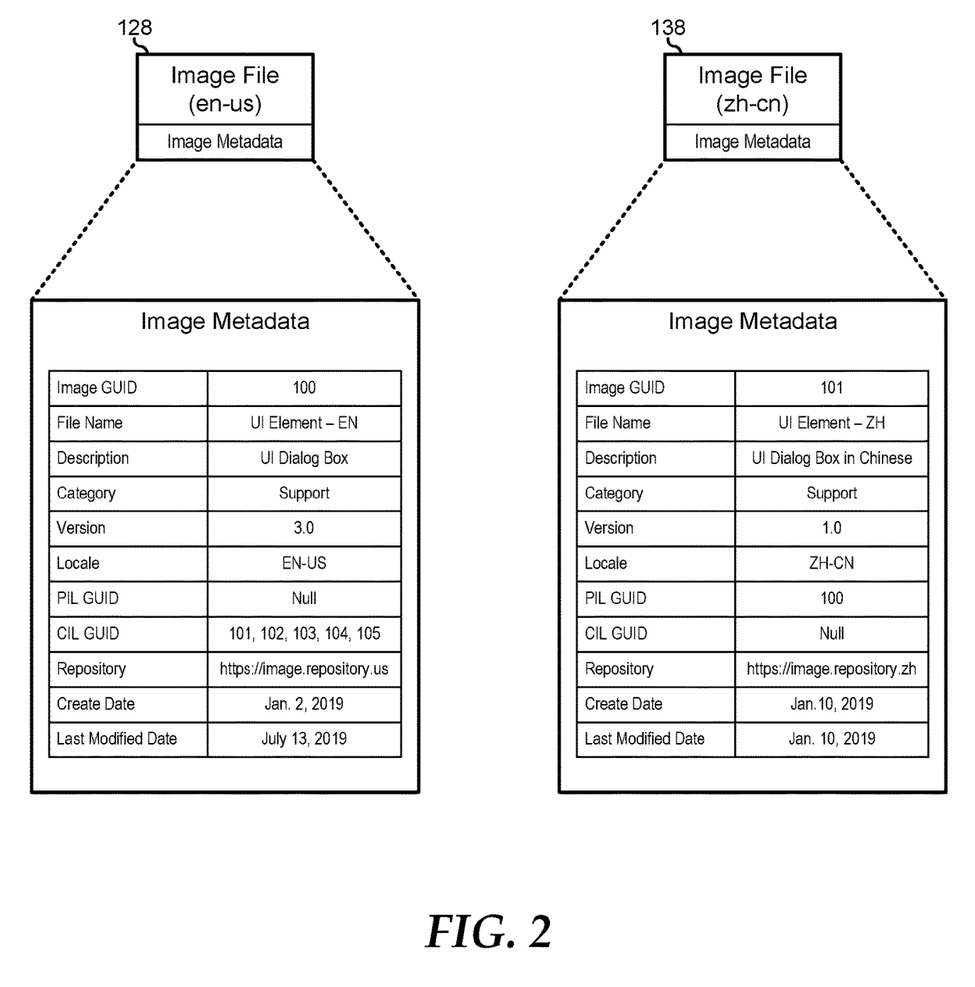
FIG. 2 is an illustration of image files in the knowledge base of FIG. 1.

As shown in FIG. 1, each parent image 128 and its associated child images 138 include metadata that is associated with the respective image. In FIG. 2, the metadata for parent image 128 and a representative child image 138 are shown. The metadata in each of parent image 128 and child images 138 include information related to the relation between the associated PL 120 and the associated CLs 130. In particular, for each image, the metadata includes fields for: a Global Unique Identifier (GUID) for the image, an image file name, an image description, an image category, an image version, an image locale, a parent image local GUID, one or more child image local GUID, an image repository file path, an image creation date, and an image last modified date. The image GUID represents a unique image identifier created within database 100 for each image, and which are generated in accordance with an Internet Engineering Task Force (IETF) Standards-Track RFC 4122, or the like. Here, parent image 128 includes a GUID value of "100" and child image 139 includes a GUID value of "101." Parent image 128 has a file name of "UI Element-EN" and is described as a "UI Dialog Box," and child image 138 has a file name of "UI Element-ZH" and is described as a "UI Dialog Box in Chinese." Parent and child images 128 and 138 are each described as being in a "Support" category. The category field can associate the respective images with a group or a type of knowledge base article, such as for a support knowledge base article, a served knowledge base article, a sales or marketing knowledge base article, or other categories, as needed or desired. Parent image 128 is shown at a version of "3.0," and child image 138 is show at a version of "1.0." Note that, as used with reference to FIG. 2, and elsewhere, the metadata values provided are exemplary values, unless otherwise indicated.

The remaining fields (the image locale, the parent image local GUID, the child image local GUID, the image repository file path, the image creation date, and the image last modified date) are utilized in creating, managing, and modifying the knowledge base, and particularly in automating the update process, as described further below. Parent image 128 has a locale of "EN-US" and child image 138 has a locale of "ZH-CN." Here, the locale of any particular image can be provided as an ISO 639 code associated with the language of any text within the image. For example, where child image 138 is identified with a locale value of "ZH-CN," the child image is thus associated with a Simplified Chinese locale. Note that where a particular image includes no text, the locale field can be provided with an indicator associated with there being no text. For example, if there is no text in an image, the locale field can carry a "NULL" value. Further in this example, where there is not text in an image, the parent image 128 and the child image 138 may have a common GUID, but the other metadata fields may differ as indicated by the needs of a parent image or a child image. For example, the file name and description may differ, even though the GUID is the same. Parent image 128 has a PIL GUID of "NULL" because there is no parent local associated with the parent image. Parent image 128 further has a CIL GUID of "101, 102, 103, 104, 105," indicating that the parent image is associated with child images in five (5) different CILs. Likewise, child image 138 has a PIL GUID of "100" because it is associated with PIL 126, and has a CIL GUID of "NULL" because there are no associated CILs to CIL 136. The repository fields include pointers to a location of the respective images, and can include a URL or the like that identifies a location of the images. Here, parent image 128 includes a URL (image.repository.us) that is associated with English language images, and child image 138 includes a URL (image.repository.zh) that is associated with Simplified Chinese language images. The created date field indicates a date on which each particular image was created, and the last modified date field indicates a date on which each particular image was last modified.

Figure 3:
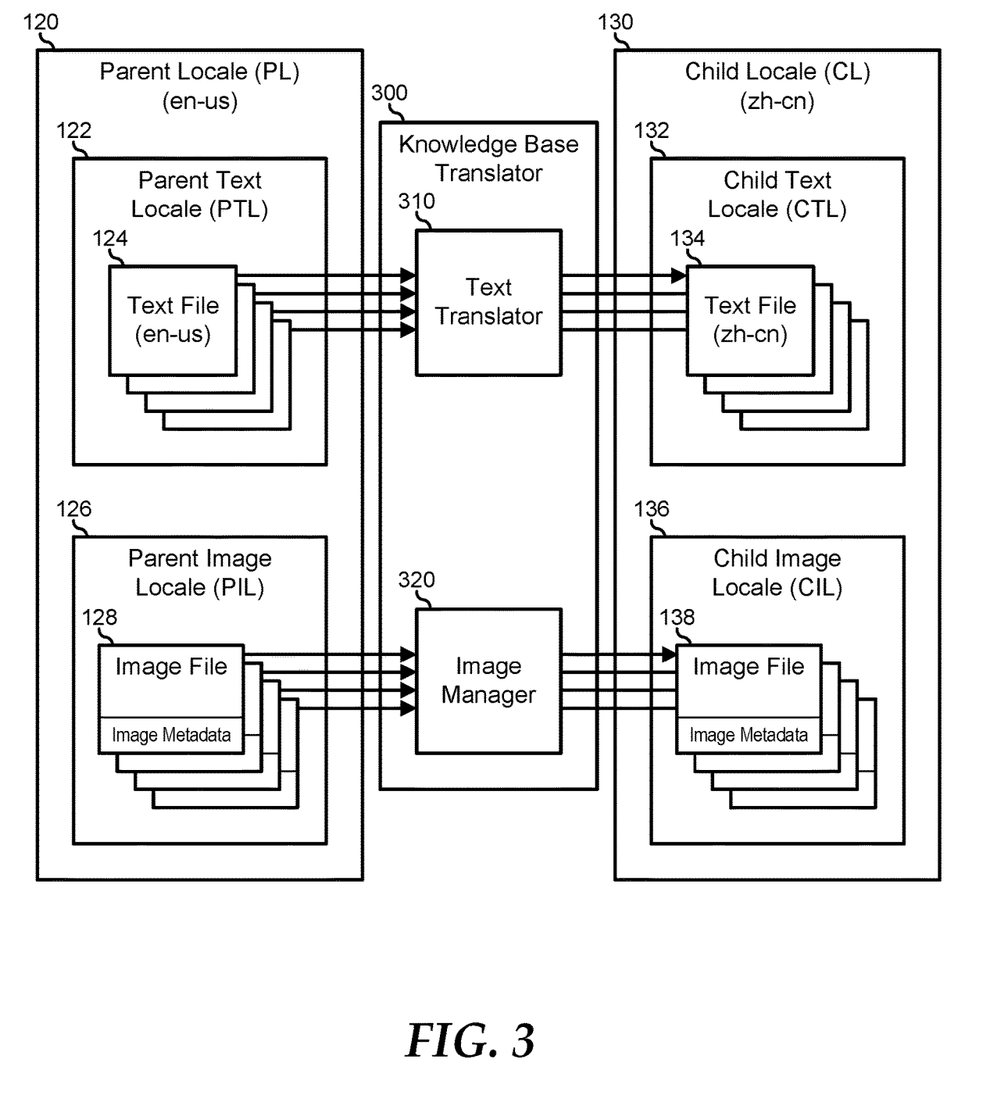
FIG. 3 is a block diagram of a knowledge base translator for translating articles in the knowledge base of FIG. 1.

FIG. 3 illustrates knowledge base 100 and the operations of a knowledge base translator 300. Knowledge base translator 300 includes a text translator 310 and an image manager 320. Text translator 310 operates to translate the text in each parent text file 124 into an associated child text file 134. Text to text translation is known in the art and will not be further described herein except as needed to illustrate the current embodiments. Image manager 320 represents a rules-based engine for determining figures from PIL 128 and CIL 138 which should be utilized in updating CL 130 in response to an update or change to PL 120. In particular, image manager 320 operates to determine if a CIL for a particular CL exists. If not, then the images from the particular PIL are rendered as the default images for the CL. In particular, when a new article is created in the parent language, the article will include a PIL with the associated parent image files. However, because the new article is yet to be translated, there is no associated CL, and hence no associated CIL. In this case, when knowledge base translator 300 translates the PL into a new CL. Here, text translator 310 translates the parent text files into associated child text files and arranges them into a new CL. Further, image manager 320 operates to create a new CIL in the CL, and to port the images from the PIL into the CIL. Here, image manager 320 operates to update the metadata fields in the child image files as needed, but the image content may remain the same. For example, the image file name, the image description, the image category, the image version, the image creation date, and the image last modified date may remain unchanged. However, a new image GUID can be created because the image locale, the parent image local GUID, the child image GUID, and the image repository file path are updated to reflect that the new image is a child image to the parent image. In general, if the CIL exists, then the images in the CIL should be rendered as the default images for the CL. However, if a particular parent image in the PIL has a newer value in the last modified date field of the metadata than the value in the last modified date field of the associated child image in the CIL, then the parent image is rendered in the CIL. Here, for example, consider where a PL of an article describing a user interface (UI) is in English, and the CL of the article is in Japanese. When a change or modification to the PL results in newer parent images of screen shots of the UI are modified into the PIL, the newer screen shots in English would be more useful to show than the old screen shots with a wrong UI. That is, the right screen shot in a wrong language is better to be displayed in the CL than the wrong screen shot in the local language. Here, image manager 320 operates to indicate that the image from the PIL was rendered in place of the old image from the CIL. Here further, the indication can be used to identify the child images that need to be manually updated, for example by taking screen shots of the appropriate UI pages in the local language. In any case, the translation of images from a PIL to an associated CIL may be overridden such that one or more particular images in the PIL are always rendered in the modified CIL, or such that one or more particular images in the CIL are always rendered in the CIL in spite of there being a newer associated image in the PIL, as needed or desired.

Figure 4:
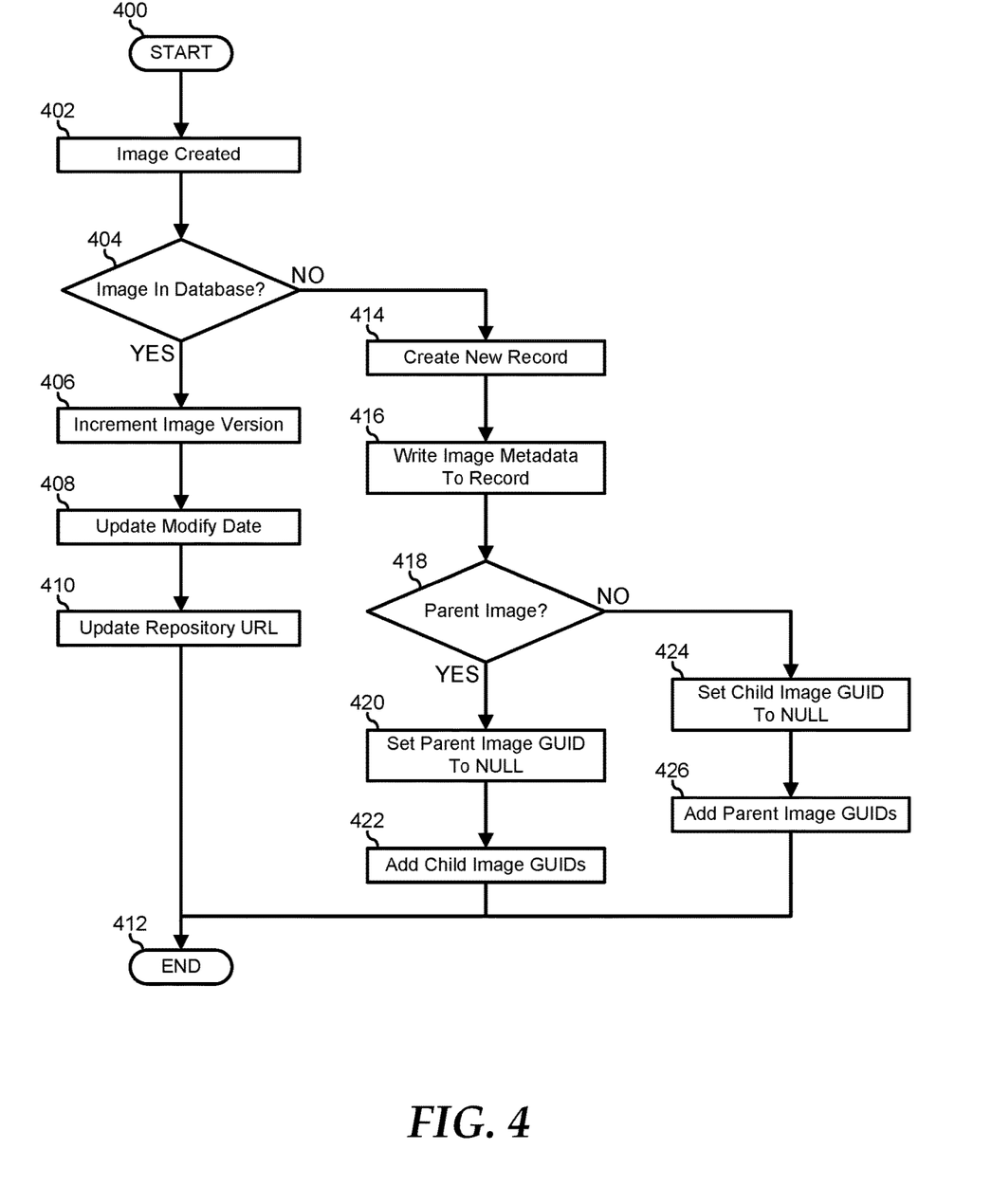
FIG. 4 is a flowchart illustrating a method for creating images in a knowledge base according to an embodiment of the current disclosure.

FIG. 4 illustrates a method for creating images in a knowledge base, starting at block 400. An image file is created in block 402. The image file may be understood broadly to include files and formats that cover a wide range of visual content, audio content, or other content, as needed or desired. A decision is made as to whether or not the image file already exists in a PIL or CIL of a Knowledge Base (KB) in decision block 404. If so, the "YES: branch of decision block 404 is taken, the existing image file's metadata is updated with incremented version information in block 406, with updated last modified date information in block 408, with updated repository information if needed in block 410, and the method ends in block 412. If the image file does not already exist in a PIL or CIL of a KB, the "NO" branch of decision block 404 is taken, a new image GUID is created in block 414, and the appropriate image metadata is written for the image file in block 416. For example, the image file can be ascribed an image file name, an image description, an image category, an initial image version, an image locale, an image repository file path, an image creation date, and an image last modified date.

A decision is made as to whether or not the image file is ascribed as a parent image in decision block 418. That is, a decision is made as to whether or not the image file should be included in the PIL or in a CIL. If the image file is ascribed as a parent image, the "YES" branch of decision block 418 is taken, the parent image GUID field in the metadata is set to NULL in block 420, the child image GUID field is written with the associated child image GUIDs in block 420, and the method ends in block 412. If the image file is not ascribed as a parent image, the "NO" branch of decision block 418 is taken, the parent image GUID field in the metadata is set to the associated parent image GUID in block 424, the child image GUID field is set to NULL in block 426, and the method ends in block 412.

Figure 5:
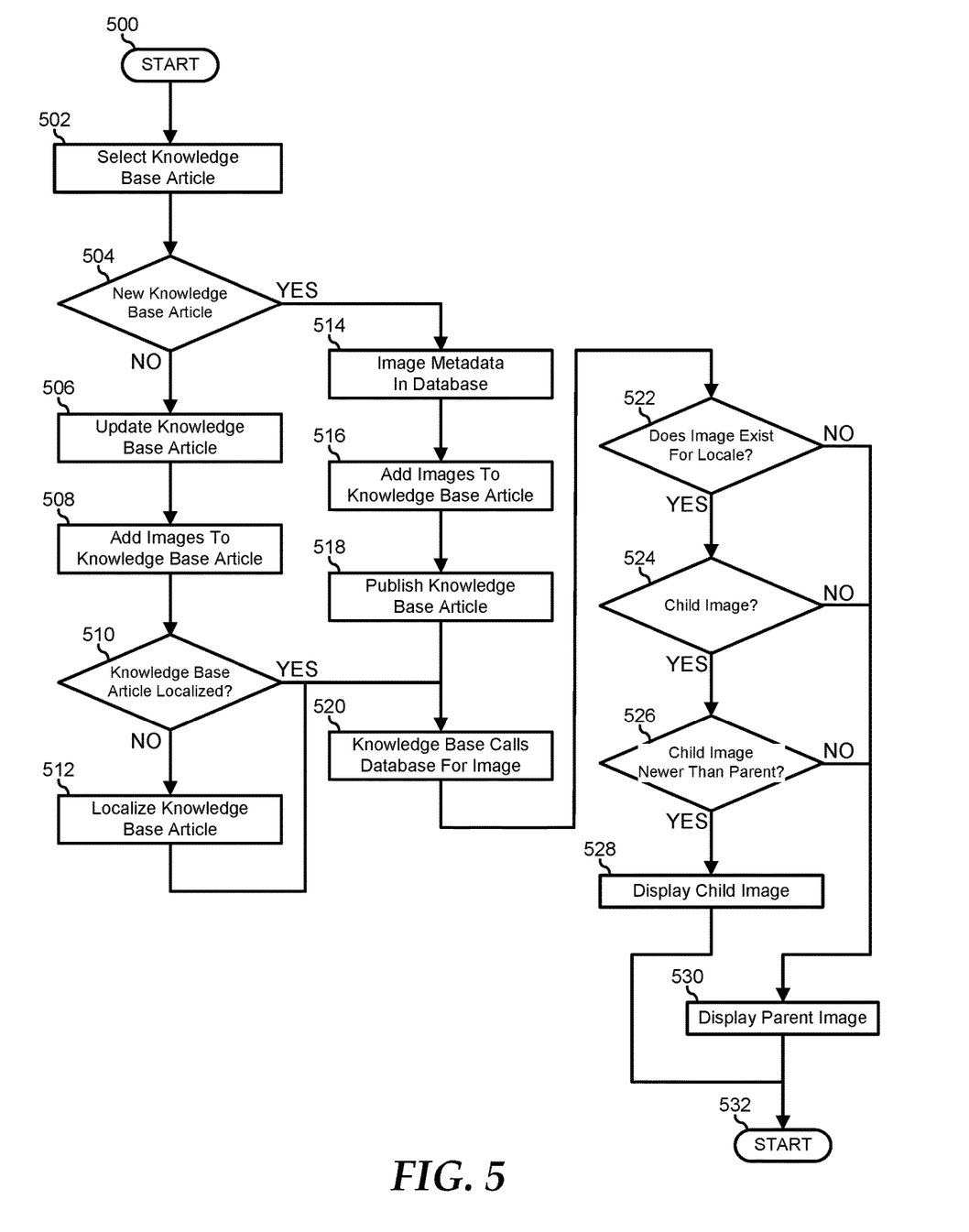
FIG. 5 is a flowchart illustrating a method for updating a knowledge base according to an embodiment of the current disclosure.

FIG. 5 illustrates a method for updating a KB article, starting in block 500. A KB article is selected for updating in block 502 and a decision is made as to whether or not the KB is a new KB in block 504. If not, the "NO" branch of decision block 504 is taken, the KB article is updated in block 506, the images are added to the KB article to the image locale in block 508, and a decision is made as to whether or not the KB article is localized in decision block 510. If not, the KB article is localized as described above in block 512, and the method proceeds to block 520, as described further, below. If the KB article is localized, the "YES" branch of decision block 510 is taken and the method proceeds to block 520, as described further, below.

Returning to decision block 504, if the KB is a new KB, the "YES" branch is taken, the image metadata is updated in block 514, the images are added to the KB article in block 516, the KB article is published in block 518, and the method proceeds to block 520. In block 520, a call is made for the KB image. A decision is made as to whether or not the image exists for the locale in decision block 522. If not, the "NO" branch of decision block 522 is taken, the parent image is displayed in block 530, and the method ends in block 532. If the image exists for the locale, the "YES" branch of decision block 522 is taken and a decision is made as to whether or not the image is a child image in decision block 524. If not, the "NO" branch of decision block 524 is taken, the parent image is displayed in block 530, and the method ends in block 532. If the image is a child image, the "YES" branch of decision block 524 is taken and a decision is made as to whether or not the child image is newer than the parent image in decision block 526. If not, the "NO" branch of decision block 526 is taken, the parent image is displayed in block 530, and the method ends in block 532. If the child image is newer than the parent image, the "YES" branch of decision block 526 is taken, the child image is displayed in block 528 and the method ends in block 532.

Figure 6:
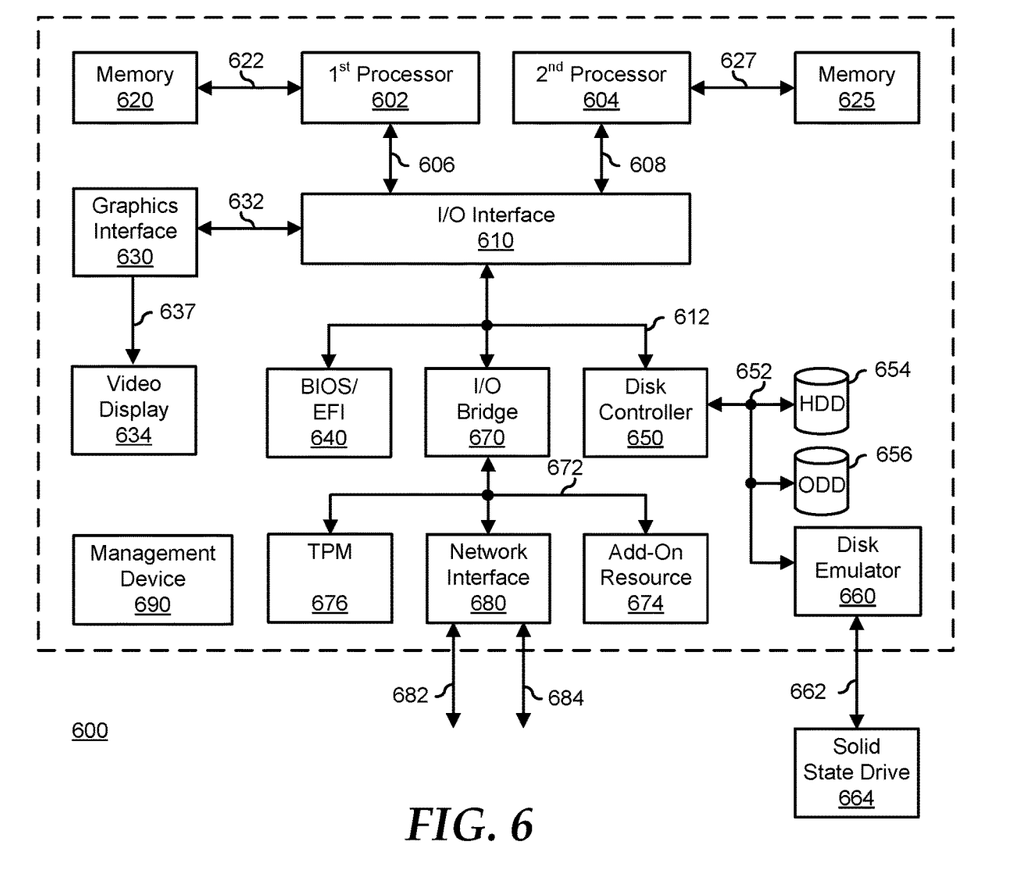
FIG. 6 is a block diagram illustrating a generalized information handling system according to another embodiment of the present disclosure.

FIG. 6 illustrates a generalized embodiment of an information handling system 600 similar to information handling systems 100 and 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656 , a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire®) interface, a proprietary interface, or a combination thereof Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand® channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish® Application Programming Interface (API), another Distributed Management Task Force (DMTF), or other management standard, and can include an Integrated Dell® Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
a memory device to store machine executable code; and
a processor to execute the machine executable code, the processor configured to:
   instantiate a knowledge base including knowledge base information arranged into a parent image locale (PIL) that includes a first parent image that presents a first portion of the knowledge base information in a first language, and a second parent image that presents a second portion of the knowledge base information; and
   translate the knowledge base information into a second language, wherein in translating the knowledge base information, the processor is further configured to:
      determine that the knowledge base information has previously been translated into the second language based upon the knowledge base information being further arranged into a child image locale (CIL) that includes a first child image that presents the first portion of the knowledge base information in the second language, and a second child image that presents the second portion of the knowledge base information;
      replace the first child image with the first parent image in the CIL when a first date when the first parent image was modified is later than a second date when the first child image was modified; and
      retain the second child image in the CIL when a first globally unique identifier (GUID) of the second parent image is the same as a second GIUD of the second child image.

2. The information handling system of claim 1, wherein in translating the knowledge base information, the processor is further configured to:
retain the first child image in the CIL when the first date is earlier than the second date.

3. The information handling system of claim 1, wherein in translating the knowledge base information, the processor is further configured to:
determine that the knowledge base information has not been previously translated into the second language based upon the knowledge base information not being further arranged into the CIL;
create the CIL in the knowledge base in response to determining that the knowledge base information has not been previously translated into the second language; and
store the first parent image in the CIL.

4. The information handling system of claim 1, wherein:
the first parent image includes first metadata that includes a third GUID associated with the first parent image; and
in determining that the knowledge base information has previously been translated into the second language, the processor is further configured to determine that the first metadata includes a fourth GUID associated with the first child image.

5. The information handling system of claim 4, wherein the first metadata further includes the first date;
second metadata included in the first child image includes the second date; and
in determining whether the first date is later than the second date, the processor is further configured to:
read the first metadata from the first parent image;
read the second metadata from the first child image; and
compare the first date from the first metadata with the second date from the second metadata.

6. The information handling system of claim 5, wherein the first metadata further includes a first parent field that is stored with a null value, and a first child field that is stored with the fourth GUID.

7. The information handling system of claim 6, wherein the second metadata further includes a second parent field that is stored with the third GUID, and a second child field that is stored with the null value.

8. The information handling system of claim 5, wherein the first metadata further includes a first code associated with the first language, and the second metadata further includes a second code associated with the second language.

9. The information handling system of claim 8, wherein the first and the second codes encode the respective first and second languages in accordance with an ISO 639 language code.

10. A method for managing images in a knowledge base on an information handling system, the method comprising:
instantiating, by a processor of the information handling system, the knowledge base, the knowledge base including knowledge base information arranged into a parent image locale (PIL) that includes a first parent image that presents a first portion of the knowledge base information in a first language;
translating the knowledge base information into a second language, wherein in translating the knowledge base information, the processor is further configured to:
determine that the knowledge base information has previously been translated into the second language based upon the knowledge base information being further arranged into a child image locale (CIL) that includes a first child image that presents the first portion of the knowledge base information in the second language;
replace the first child image with the first parent image in the CIL when a first date when the first parent image was modified is later than a second date when the first child image was modified; and
retain the second child image in the CIL when a first globally unique identifier (GUID) of the second parent image is the same as a second GIUD of the second child image.

11. The method of claim 10, wherein in translating the knowledge base information, the method further comprises:
retaining the first child image in the CIL when the first date is earlier than the second date.

12. The method of claim 10, wherein in translating the knowledge base information, the method further comprises:
determining that the knowledge base information has not been previously translated into the second language based upon the knowledge base information not being further arranged into the CIL;
creating the CIL in the knowledge base in response to determining that the knowledge base information has not been previously translated into the second language; and
storing the first parent image in the CIL.

13. The method of claim 10, wherein:
the first parent image includes first metadata that includes the first GUID associated with the first parent image; and
in determining that the knowledge base information has previously been translated into the second language, the method further comprises determining that the first metadata includes the second GUID.

14. The method of claim 13, wherein
the first metadata further includes the first date;
second metadata included in the first child image includes the second date; and
in determining whether the first date is later than the second date, the method further comprises:
reading the first metadata from the first parent image;
reading the second metadata from the first child image; and
comparing the first date from the first metadata with the second date from the second metadata.

15. The method of claim 14, wherein the first metadata further includes a first parent field that is stored with a null value, and a first child field that is stored with the second GUID.

16. The method of claim 15, wherein the second metadata further includes a second parent field that is stored with the first GUID, and a second child field that is stored with the null value.

17. The method of claim 14, wherein the first metadata further includes a first code associated with the first language, and the second metadata further includes a second code associated with the second language.

18. The method of claim 17, wherein the first and the second codes encode the respective first and second languages in accordance with an ISO 639 language code.

19. An information handling system, comprising:
a memory; and
a processor in communication with the memory and configured to:
instantiate a knowledge base including knowledge base information arranged into:

a parent text locale (PTL) that includes a parent text file that presents a first portion of the knowledge base information in a first language; and a parent image locale (PIL) that includes a first parent image file that presents a second portion of the knowledge base information in the first language and a second parent image file that presents a third portion of the knowledge base information; and translate the knowledge base information into a second language, wherein in translating the knowledge base information, the processor is further configured to:

determine that the knowledge base information has previously been translated into the second language based upon the knowledge base information being further arranged into:

a child text locale (CTL) that includes a child text file that presents the first portion of the knowledge base information in the second language; and a child image locale (CIL) that includes a first child image file that presents the second portion of the knowledge base information in the second language, and a second child image that presents the third portion of the knowledge base;

translate the parent text file to a revised child text file;

replace the child text file with the revised child text file in the CTL; and replace the first child image with the first parent image in the CIL when a first date when the first parent image was modified is later than a second date when the first child image was modified; and retain the third child image in the CIL when a first globally unique identifier (GUID) of the third parent image is the same as a second GIUD of the third child image.

20. The information handling system of claim 19, wherein in translating the knowledge base information, the processor is further configured to:

retain the first child image in the CIL when the first date is earlier than the second date.

\* \* \* \* \*